(12) United States Patent
Watanabe et al.

(10) Patent No.: US 8,297,158 B2
(45) Date of Patent: Oct. 30, 2012

(54) COMBINED PROCESSING LATHE AND ITS TOOL POST

(75) Inventors: Masahiko Watanabe, Englewood Cliffs, NJ (US); Atsushi Aoyagi, Tokyo (JP)

(73) Assignee: Citizen Holdings Co., Ltd., Tokyo (JP)

( * ) Notice: Subject to any disclaimer, the term of this patent is extended or adjusted under 35 U.S.C. 154(b) by 690 days.

(21) Appl. No.: 12/376,218

(22) PCT Filed: Aug. 1, 2007

(86) PCT No.: PCT/JP2007/065066
§ 371 (c)(1),
(2), (4) Date: Jun. 2, 2009

(87) PCT Pub. No.: WO2008/016076
PCT Pub. Date: Feb. 7, 2008

(65) Prior Publication Data
US 2009/0308214 A1    Dec. 17, 2009

(30) Foreign Application Priority Data

Aug. 4, 2006    (JP) .................................. 2006-213985

(51) Int. Cl.
*B23Q 16/00*    (2006.01)
*B23Q 5/04*     (2006.01)
(52) U.S. Cl. .......................................... 82/121; 82/159
(58) Field of Classification Search .............. 82/120, 82/121, 138, 117, 159; 29/36, 335, 159
See application file for complete search history.

(56) References Cited

U.S. PATENT DOCUMENTS

| 2,051,720 | A | * | 8/1936 | Kingsbury | 408/38 |
| 3,203,071 | A | * | 8/1965 | Uchida | 29/36 |
| 4,182,205 | A | * | 1/1980 | Baker | 82/121 |
| 4,597,144 | A | * | 7/1986 | Frank et al. | 483/37 |
| 4,843,691 | A | * | 7/1989 | Hafla et al. | 29/36 |
| 5,031,490 | A | * | 7/1991 | Grossmann | 82/124 |
| 5,127,140 | A | * | 7/1992 | Oiwa et al. | 29/27 C |
| 5,175,914 | A | * | 1/1993 | Mitsukuchi et al. | 29/27 C |
| 6,298,531 | B1 | * | 10/2001 | Baumbusch et al. | 29/40 |
| 6,810,777 | B1 | * | 11/2004 | Baumann | 82/129 |
| 6,865,788 | B2 | * | 3/2005 | Pasquetto | 29/38 B |
| 6,948,411 | B2 | * | 9/2005 | Grossmann | 82/129 |
| 2004/0211301 | A1 | | 10/2004 | Kobayashi et al. | |

FOREIGN PATENT DOCUMENTS

DE    195 28 404 A1    6/1997
(Continued)

OTHER PUBLICATIONS

European Search Report Jun. 19, 2009, issued in corresponding European Patent Application No. 07791747.4.
(Continued)

*Primary Examiner* — Will Fridie, Jr.
(74) *Attorney, Agent, or Firm* — Westerman, Hattori, Daniels & Adrian, LLP

(57) ABSTRACT

Turrets (11, 12), which can rotate about a common axis (y-y) and on the outer peripheral surfaces of which a plurality of tools (15) are radially installed, are disposed along the axis (y-y) in a turret housing (100). Respective turrets (11, 12) can be dividedly rotated by separate turret driving motors (13, 14).

23 Claims, 14 Drawing Sheets

FOREIGN PATENT DOCUMENTS

| | | |
|---|---|---|
| EP | 1270145 A2 | 1/2003 |
| EP | 1 452 269 A1 | 9/2004 |
| GB | 1 304 245 | 1/1973 |
| JP | 49-46359 B1 | 12/1974 |
| JP | 56-134101 A | 10/1981 |
| JP | 59-16882 B1 | 4/1984 |
| JP | 62-236607 A | 10/1987 |
| JP | 2-110401 U | 9/1990 |
| JP | 07-227704 A | 8/1995 |
| JP | 10-15702 A | 1/1998 |
| JP | 11-138374 A | 5/1999 |
| JP | 2006-150574 A | 6/2006 |

OTHER PUBLICATIONS

European Office Action dated Oct. 13, 2010, issued in corresponding European Patent Application No. 07 791 747.4.

International Search Report of PCT/JP2007/065066, Mailing Date of Oct. 16, 2007.

* cited by examiner

F I G. 4
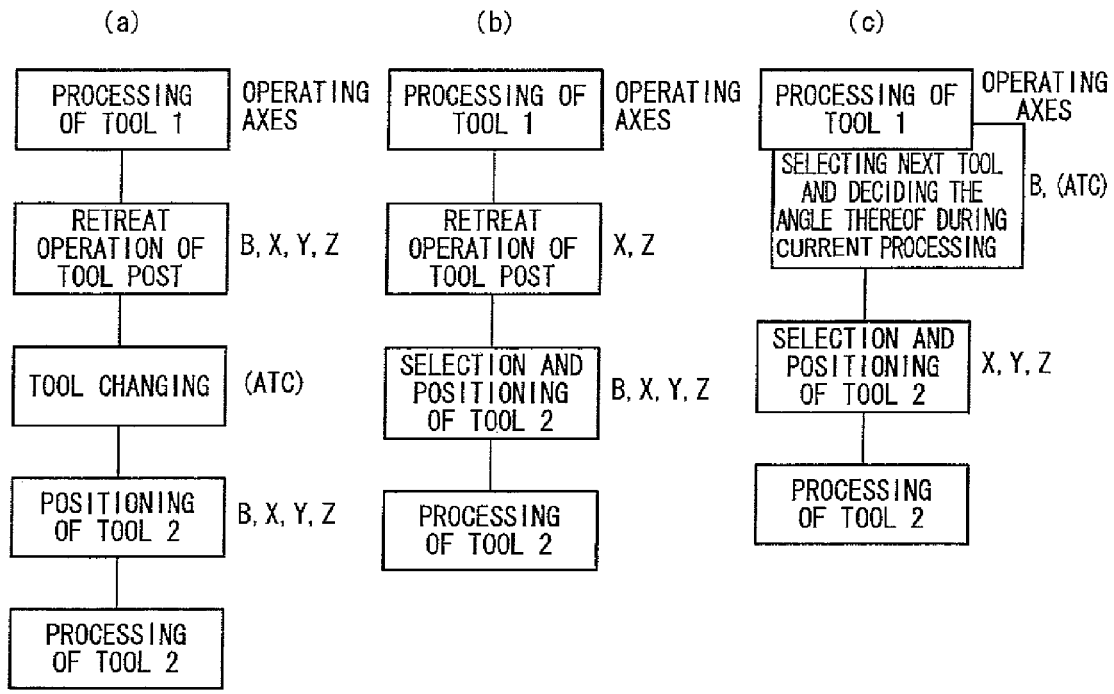
F I G. 5
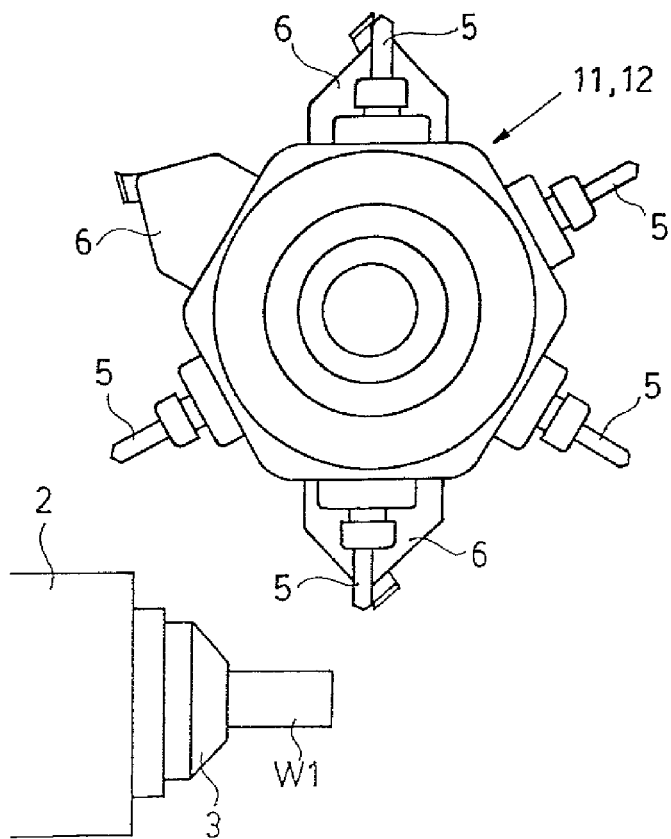

COMBINED PROCESSING LATHE AND ITS TOOL POST

TECHNICAL FIELD

The invention relates to a combined processing lathe (multiple turning center) performing a plurality of different kinds of processings (machinings) on a workpiece and a tool post being equipped in the lathe and selectably holding a plurality of tools used for the processings.

BACKGROUND TECHNOLOGY

A lathe generally performs processing by abutting a tool such as a cutting tool being a cutter against a workpiece for machining which is rotationally driven by a main spindle.

Further, a lathe which performs a plurality of different kinds of processings, namely, combined processing on a workpiece is also in wide use, and various types of lathes or machine tools such as disclosed in, for example, Patent Documents 1 to 5 are known.

Patent Document 1: JP H11-138374 A
Patent Document 2: JP H10-15702 A
Patent Document 3: EP 1270145 A2
Patent Document 4: JP S62-236607 A
Patent Document 5: JP H7-227704 A A combined processing lathe disclosed in Patent Document 1 is a lathe having a tool magazine holding a plurality of kinds of cutting tools mounted thereon, and capable of performing combined processing while successively changing the tool held by a tool spindle being a single spindle with the use of a tool changer in accordance with the processing contents. As a tool used in such a combined processing lathe, there are various types of tools such as "cutting tool (tool bit)" used for turning in which processing is performed without rotating the tool spindle, "drill" used by rotating the tool spindle, "milling cutter" which performs surface processing, and "grindstone tool" which performs grinding.

However, in such a combined processing lathe in which the tool held by the tool spindle being the single spindle is changed by the tool changer according to each processing content, although the flexibility regarding the number of tools and a processing method conducted by the combined processing lathe is high, since the tool has to be changed at every processing step in which a different tool is used, the time for changing tools, namely, an unprocessing time has to be provided, which brings a limitation to the reduction in the processing time per one workpiece.

In order to enable to change the tools in such a lathe in a short period of time, a flat turret and a rotary turret (turning tool post) are used in a multifunction lathe disclosed in, for example, Patent Document 2. The flat turret arranges a plurality of tools (cutters) linearly and in a comb-teeth shape, and by moving the tool post (tool bit) in the arranged direction, it can select either one of the tools attached to the tool post so as to correspond the tool to a workpiece for machining.

Meanwhile, the rotary turret arranges, on respective side surfaces of a rotatable turret having a polygonal column shape, each of tools (cutters) in a radial manner with respect to a rotary shaft, and by dividedly rotating the turret, it can select either one of the tools attached to the turret so as to correspond the tool to a workpiece for machining.

It is also conducted that the processing time is reduced by independently or simultaneously performing the processings with these two kinds of tool posts.

Since each the aforementioned flat turret and rotary turret can selectively attach the plurality of tools, if the plurality of tools used for the processings are attached to the respective turrets, there is no need to change the tools and the necessary tools can be selected in a short period of time, resulting that the processing time for the workpiece can be reduced.

Since the flat turret selects the tool by its linear movement, the selection speed thereof is fast, and when a tool used for an immediately preceding processing and a tool to be used for the following processing are adjacently attached, the tool to be used for the following processing can be selected in a quite short period of time. However, if the tools are attached separately in the vicinity of both end portions of the turret, there is a problem that a movement stroke becomes long and the selection time also becomes long.

Meanwhile, although it rather takes time for the rotary turret to dividedly rotate the turret, even if the tool used for the immediately preceding processing and the tool to be used for the following processing are attached in separate positions, by selecting the rotating direction, the difference in selection time does not become considerably large.

Accordingly, in a machine tool disclosed in, for instance, Patent Document 3, respective side surfaces of a tool post head corresponding to the turret are divided into a plurality of parts (hereinafter, referred to as "stage") having intervals therebetween in a direction along a rotary shaft of the tool post head, each stage has a different kind of tool attached thereto, and the tool post head can be integrally and linearly moved in the direction along the rotary shaft.

Therefore, the tool post head can select, same as the rotary turret, the tool attached to the same stage on the side surface by being dividedly rotated (turned) around the rotary shaft, and can select, same as the flat turret, either of the plurality of tools attached to the different stage on the same side surface of the tool post head by linearly moving in the direction along the rotary shaft.

Specifically, the tool post with this structure has both functions of the rotary turret and the flat turret, and it can select, when the tool used for the immediately preceding processing and the tool to be used for the following processing are attached to the different stages on the same side surface of the tool post head, the tool to be used for the following processing in a quite short period of time only by linearly moving the tool post head in the direction of rotary shaft.

However, if the tool to be used for the following processing is attached to the different stage at the different dividedly rotated position of the tool post head, there is a need that the tool post head is dividedly rotated as well as moved linearly. Accordingly, the time for selecting the tool, namely, the unprocessing time has to be provided, resulting that the reduction in the processing time per one workpiece cannot be fully realized. Further, since disposition angles of the tools are decided depending on the number of divisions of the side surfaces of the tool post head in its rotational direction, there are a lot of restrictions on flexibility of processing in such a case where, for example, processing on a workpiece held by a first spindle and processing on a workpiece held by a second spindle are simultaneously conducted, and the tool post cannot be used effectively, which also results in creating a problem when reducing the processing time per one workpiece.

In addition, examples where a plurality of turrets are disposed in an automatic lathe while being shifted to the positions in a direction of rotary shaft thereof are also disclosed in Patent Documents 4 and 5. According to Patent Document 4, two turrets (rotary tables) are provided in which they can be independently rotated and one of them can be shifted in an axial direction with respect to the other one. Further, it is structured such that both the turrets are fixed, together with their cutters (tools), to fixed positions with respect to a housing during a cutting operation, and the respective turrets can be dividedly rotated independently during a change of cutters.

However, it is not possible to previously select, during when the processing is performed using the cutter (tool) of one of the turrets, a cutter (tool) to be used for the following processing by dividedly rotating the other turret.

Patent Document 5 discloses that the number of usable tools is increased without enlarging turrets, by integrating two turrets and disposing them in series in a state where they are shifted by predetermined angles in rotational directions thereof, and that rotating tools attached to either of the turrets can be rotated by one common driving shaft.

However, the turrets cannot be dividedly rotated separately and independently, so that also in this case, it is not possible to previously select, during when the processing is performed using the tool of one of the turrets, a tool to be used for the following processing by dividedly rotating the other turret.

Accordingly, each of these turrets cannot fully reduce the time taken for selecting the tools, namely, the unprocessing time, resulting that the reduction in the processing time per one workpiece cannot be fully realized. Further, there are a lot of restrictions on the flexibility of processing.

DISCLOSURE OF THE INVENTION

Problems to be Solved by the Invention

As described above, each of the conventional combined processing lathes cannot achieve a sufficient reduction in time for selecting the tools performed by its tool post and a sufficient flexibility of processing, so that there are limitations in reducing the processing time per one workpiece.

The invention has been made in view of such circumstances, and an object thereof is to enable to largely reduce a processing time per one workpiece by constantly minimizing the time for selecting tools performed by a tool post in a combined processing lathe to minimize an unprocessing time, as well as by lowering the restrictions on the flexibility of processing.

Means for Solving the Problems

In order to achieve the aforementioned object, a tool post according to the invention is characterized in that it is provided with a plurality of turrets each capable of being rotated around a common axis and having a plurality of tool attachment parts on an outer peripheral surface thereof disposed along the axis, and separate turret drive mechanisms dividedly rotating each of the plurality of turrets.

If the tool post has three axes of Z-axis being parallel to a main spindle of a combined processing lathe, X-axis being perpendicular to the Z-axis, and Y-axis being orthogonal to a plane including the Z-axis and the X-axis, the common axis may be an axis along the Y-axis.

Each of the respective separate turret drive mechanisms may be provided with a turret rotary shaft rotated by a motor, and a gear mechanism transmitting a rotation of the turret rotary shaft to a corresponding turret.

Further, the respective separate turret drive mechanisms are preferably capable of controlling dividedly rotated positions of the plurality of respective turrets so that positions of the respective tool attachment parts in the dividedly rotated direction coincide with each other and the positions are mutually displaced by an arbitrary angle.

In these tool posts, at least one of the plurality of tool attachment parts of the plurality of respective turrets is a rotating tool attachment part, and a rotating tool drive mechanism rotating a plurality of rotating tools to be attached to the respective rotating tool attachment parts using a common rotary shaft can be provided.

Alternately, it is also possible to provide a rotating tool drive mechanism rotating the rotating tools to be attached to the respective rotating tool attachment parts of the plurality of respective turrets by each turret using separate rotary shafts driven by separate rotating tool driving motors.

Further, a combined processing lathe according to the invention is a combined processing lathe provided with a tool post having three axes of Z-axis being parallel to a main spindle, X-axis being perpendicular to the Z-axis, and Y-axis being orthogonal to a plane including the Z-axis and the X-axis, and the tool post being either of the aforementioned tool posts.

EFFECT OF THE INVENTION

A combined processing lathe provided with a tool post according to the invention can previously select, during when a workpiece is machined by a tool attached to one of a plurality of turrets of the tool post, a tool necessary for the following processing attached to another turret, and can move the tool necessary for the following processing attached to another turret to a processing position in a minimum period of time by linearly moving the tool post in a Y-axis direction right after the completion of the current processing, to thereby start the following processing.

Further, it also becomes possible to simultaneously conduct processings in such a manner that the processing is performed on a workpiece held by a first spindle using a tool held by a certain turret while the processing is performed on another workpiece held by a second spindle using a tool 2 held by another turret.

In addition, each of the turrets can be turned at an arbitrary angle to perform processings, so that it also becomes possible to perform, on the workpiece held by the first spindle and the workpiece held by the second spindle, boring using drills having different and arbitrary inclinations with respect to center axes of the respective workpieces, processing of a groove and a surface with the use of milling, turning and boring, and the like, which results in largely extending the flexibility of processing.

Accordingly, it is possible to minimize the unprocessing time and to lower the restrictions on the flexibility of processing, which enables to remarkably reduce the processing time per one workpiece.

BRIEF DESCRIPTION OF DRAWINGS

FIG. 4 is showing process charts drawing parallel between workpiece processing steps conducted by a conventional combined processing lathe and that conducted by the combined processing lathe according to the invention;

FIG. 5 is substantial plan view showing a state before the processing using the combined processing lathe according to the invention;

REFERENCE OF NUMERALS

| 2: | headstock |
| 3: | main spindle (front spindle) |
| 4: | back spindle |
| 5: | drill (rotating tool) |
| 6: | cutting tool (turning tool or tool bit) |
| 7: | drill attached horizontally (rotating drill) |
| 8: | rear headstock (back spindle head) |
| 10, 50: | tool post |
| 11, 12: | turret |
| 11a, 12a: | tool attachment part |
| 13, 14: | turret driving motor |
| 15: | rotating tool (drill) |
| 17: | rotating tool driving motor |
| 18, 22, 32: | slider |
| 19: | Y-axis motor |
| 20: | X-axis carriage |
| 21, 31, 1c: | slide rail |
| 23: | X-axis motor |
| 30: | Z-axis carriage |
| 33: | Z-axis motor |
| 100: | turret housing |
| 100a: | hollow portion |
| 101, 102: | arm portion |
| 103: | rotary shaft (for rotating tool) |
| 104: | fixed end plate |
| 105: | rotary end plate |
| 106, 107, 108, 132: | ball bearing |
| 110: | upper turret rotary shaft |
| 120: | lower turret rotary shaft |
| 110g, 120g: | worm gear |
| 111, 121: | cylindrical rotor |
| 111g, 121g: | worm wheel |
| 112, 122: | cross roller bearing |
| 113, 114, 115, 123, 124: | oil seal |
| 131, 135, 136: | bevel gear |
| 501: | bearing plate |
| 510, 520: | rotating tool driving motor |
| 511: | first rotary shaft |
| 521: | second rotary shaft |
| 512, 513, 522, 523: | belt pulley |
| 514, 524: | belt |
| 515, 525: | bevel gear |

BEST MODE FOR CARRYING OUT THE INVENTION

Hereinafter, preferred embodiments of the present invention will be described with reference to the attached drawings.

First, with reference to FIG. 1 to FIG. 3, explanations will be made regarding a configuration example of a combined processing lathe according to the invention and a basic configuration example of a tool post according to the invention included in the combined processing lathe.

Figure 1:
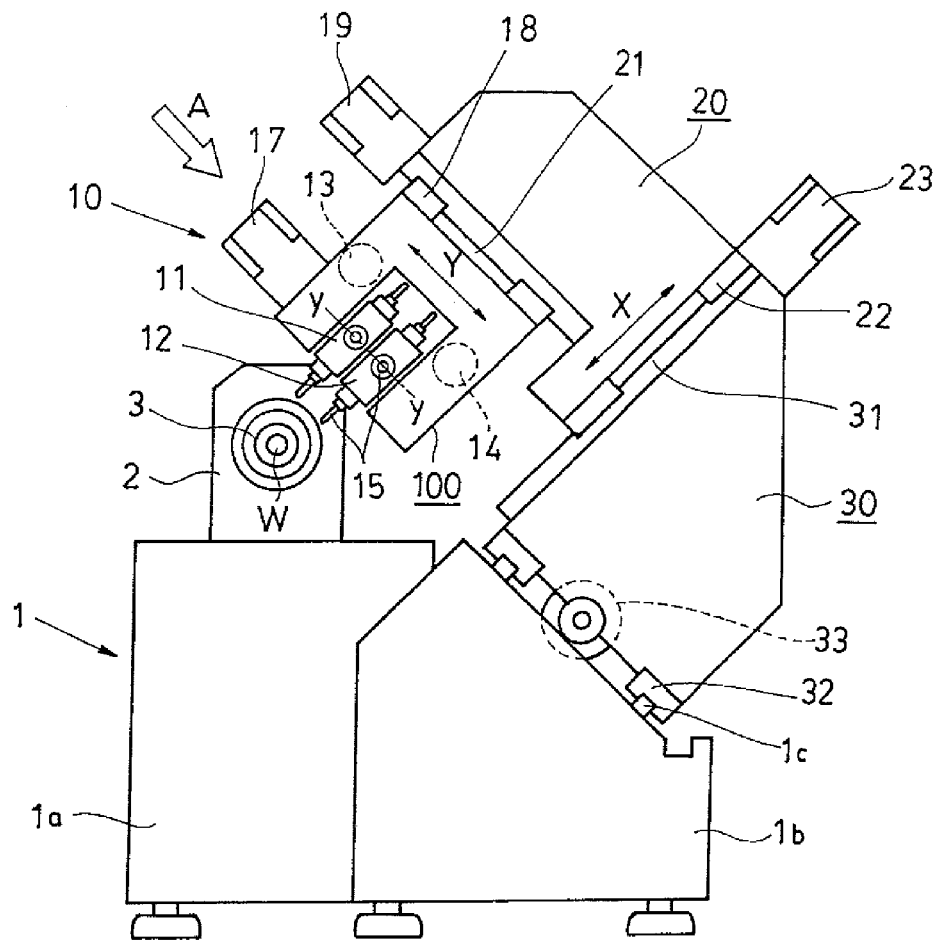
FIG. 1 is a front view showing a schematic configuration of an entire combined processing lathe provided with a tool post being one embodiment of the invention.
Figure 2:
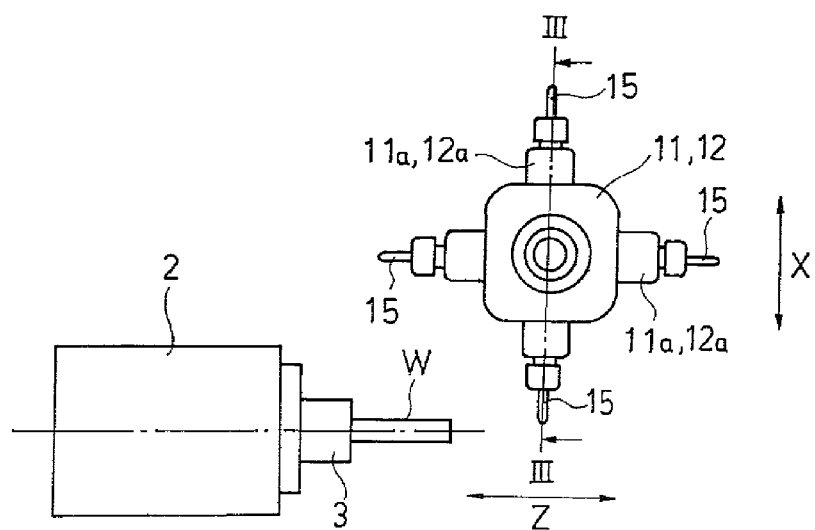
FIG. 2 is a view showing a relation between a turret and a main spindle of the tool post seen from a direction indicated by an arrow A in FIG. 1.

FIG. 1 is a schematic front view showing an entire configuration of the combined processing lathe, and FIG. 2 is a view showing a relation between a turret and a main spindle of the tool post seen from a direction indicated by an arrow A in FIG. 1. FIG. 3 shows an internal configuration of an entire tool post by enlarging its longitudinal section taken along III-III line in FIG. 2.

In FIG. 1, a headstock 2 supporting a rotatable main spindle 3 is mounted on a headstock supporting part 1a of a bed 1. The headstock 2 can be moved in a Z-axis direction being orthogonal to the paper surface by a not-shown drive mechanism.

Further, the main spindle 3 holds a workpiece W for machining using a chuck via a guide bush provided therein, and is rotated by a not-shown spindle motor. A rotation speed thereof can be varied from high speed to low speed.

Various types of tools to be used for processing the workpiece W are held by a tool post 10. All composing members of the tool post 10 are assembled in a fork-shaped turret housing 100, and in a hollow portion of the turret housing 100, two turrets 11 and 12 are arranged in upper and lower stages along an axis y-y in a Y-axis direction.

In this example, each of the turrets 11 and 12 has the same regular quadranglar board shape in which respective corners are chamfered, tool attachment parts 11a and 12a are provided on respective surfaces of outer peripheral surfaces of the respective turrets 11 and 12 formed of four surfaces being mutually parallel or perpendicular, and each of arbitrary tools can be attached to the tool attachment parts 11a and 12a. FIG. 2 shows a state where the respective tool attachment parts 11a and 12a of the turrets 11 and 12 are in the same rotational position and are just overlapped with each other.

In this example, in order to simplify the explanation, all of the tool attachment parts 11a and 12a are supposed to be rotating tool attachment parts, and a rotating tool 15 such as a drill is attached to each of the rotating tool attachment parts. Actually, these respective rotating tools 15 differ in their diameters and their usage, and a thread-cutting rotating tool and the like are also included in the rotating tool 15.

The turrets 11 and 12 capable of rotating around the axis y-y along the Y-axis are disposed along the axis y-y and each of which is dividedly rotated independently by separate turret driving motors 13 and 14 provided at the back of the turret housing 100. Further, all of the rotating tools 15 attached to the turrets 11 and 12 are rotationally driven by a common rotating tool driving motor 17. Details of these rotating mechanisms will be described later with reference to FIG. 3.

The turret housing 100 of the tool post 10 is attached to an X-axis carriage 20 by fitting a pair of sliders 18 fixedly provided to a side surface of the turret housing 100 with a slide rail 21 fixedly provided to a side surface of the X-axis carriage 20 so that the turret housing 100 can be moved in the Y-axis direction by a Y-axis motor 19 and a not-shown feed screw and nut.

The X-axis carriage 20 is attached to a Z-axis carriage 30 by fitting a pair of sliders 22 fixedly provided to a bottom surface of the X-axis carriage 20 with a slide rail 31 fixedly provided to an upper surface of the Z-axis carriage 30 so that the X-axis carriage 20 can be moved in the X-axis direction by an X-axis motor 23 and a not-shown feed screw and nut.

Further, the Z-axis carriage 30 is attached to the bed 1 by fitting a pair of sliders 32 fixedly provided to a bottom surface of the Z-axis carriage 30 with a slide rail 1c fixedly provided to a slanted surface of a tool post supporting part 1b of the bed 1 so that the Z-axis carriage 30 can be moved in the Z-axis direction being orthogonal to the paper surface of FIG. 1 (direction indicated by an arrow Z in FIG. 2) by a Z-axis motor 33 provided at the back thereof and a not-shown feed screw and nut.

The Z-axis is an axis being parallel to the main spindle 3 of the combined processing lathe, the X-axis is perpendicular to the Z-axis, and the Y-axis is an axis being orthogonal to a plane including the Z-axis and the X-axis. Therefore, the tool post 10 has three axes of X-axis, Y-axis and Z-axis each being orthogonal to one another, and can be moved three-dimensionally in a composite direction of moving directions along the respective axes.

Note that it is possible to attach to the respective tool attachment parts 11a and 12a of the respective turrets 11 and 12, various types of tools such as a cutting tool being a turning tool, a milling cutter for performing surface processing, and a grindstone tool for performing grinding processing, other than the rotating tools such as drills and milling cutters.

Next, an internal configuration of the tool post 10 will be described with reference to FIG. 3.

In the fork-shaped turret housing 100, there is formed a hollow portion 100a between upper and lower arm portions 101 and 102. In the upper and lower arm portions 101 and 102, a concentric opening is formed around the axis y-y along the Y-axis, and in the center of the opening, a rotary shaft 103 is rotatably supported by a fixed end plate 104 at a side of the arm portion 101 and a rotary end plate 105 composed of two members at a side of the arm portion 102 via ball bearings 106 and 107. A center axis of the rotary shaft 103 is the axis y-y.

Inside the hollow portion 100a of the turret housing 100, the turrets 11 and 12 are separately and rotatably arranged around the axis y-y in upper and lower stages through which the rotary shaft 103 penetrates.

In the upper and lower arm portions 101 and 102, an upper turret rotary shaft 110 and a lower turret rotary shaft 120 respectively extending in the Z-axis direction being orthogonal to the paper surface are rotatably inserted, and each of the turret rotary shafts is separately rotated by the turret driving motors 13 and 14 described in FIG. 1.

Worm gears 110g and 120g are respectively formed on the upper turret rotary shaft 110 and the lower turret rotary shaft 120.

Further, a cylindrical rotor 111 is provided in a rotatable manner inside the arm portion 101 via a cross roller bearing (roller bearing) 112 and oil seals 113, 114 and 115, and a worm wheel 111g formed on an outer periphery of the cylindrical rotor 111 rotates by engaging with the worm gear 110g of the upper turret rotary shaft 110. The cylindrical rotor 111 is integrally coupled to the upper stage of turret 11 in the rotational direction, so that the cylindrical rotor 111 and the turret 11 integrally rotate around the axis y-y.

Meanwhile, a cylindrical rotor 121 is provided in a rotatable manner inside the arm portion 102 via a cross roller bearing (roller bearing) 122 and oil seals 123 and 124, and a worm wheel 121g formed on an outer periphery of the cylindrical rotor 121 rotates by engaging with the worm gear 120g of the lower turret rotary shaft 120. The cylindrical rotor 121 is integrally coupled to the rotary end plate 105 and the lower stage of turret 12 in the rotational direction, so that the cylindrical rotor 121 and the turret 12 integrally rotate around the axis y-y.

The turrets 11 and 12 are fitted via a ball bearing 108 so as to be relatively rotated with each other.

As described above, each of the tool attachment parts 11a and 12a is provided to the respective plane portions of the outer peripheral surfaces of the turrets 11 and 12, and in the illustrated example, each of the tool attachment parts 11a and 12a is a rotating tool attachment part. Accordingly, in the respective tool attachment parts 11a and 12a, bevel gears 131 each provided with a shaft hole 131a for inserting the rotating tool 15 and having an integral shaft are inserted from inner peripheral surface sides of the turrets 11 and 12 in a rotatable manner via ball bearings 132.

Further, a bevel gear 135 engaging with all the bevel gears 131 in the upper stage of turret 11 and a bevel gear 136 engaging with all the bevel gears 131 in the lower stage of turret 12 are respectively spline-connected to the rotary shaft 103, in which they are biased and locked by springs at predetermined positions in a direction along the axis y-y.

Therefore, when the rotary shaft 103 is rotated as indicated by an arrow B by the rotating tool driving motor 17 shown in FIG. 1, all the bevel gears 131 engaging with the bevel gears 135 or 136 constituting the gear mechanism rotate, which results in rotating all the rotating tools 15 inserted into the respective tool attachment parts 11a and 12a of the upper and lower stages of turrets 11 and 12.

If the tool attachment parts 11a and 12a are tool attachment parts for inserting fixed tools such as cutting tools, the bevel gears 131 and the ball bearings 132 are not provided to the tool attachment parts 11a and 12a.

With the use of this tool post 10, by rotating the upper turret rotary shaft 110 or the lower turret rotary shaft 120 using the turret driving motors 13 or 14 shown in FIG. 1, it is possible to dividedly rotate (turn) the respective rotating tools 15 at desired positions by independently rotating the respective upper stage of turret 11 or the lower stage of turret 12 by an arbitrary rotation angle.

As described above, the mechanism for dividedly rotating the turrets 11 and 12 independently using rotations of the upper turret rotary shaft 110 and the lower turret rotary shaft 120 via the worm gears 110g and 120g, the cylindrical rotor 111 having the worm wheel 111g, the cylindrical rotor 121 having the worm wheel 121g and the like, is the turret drive mechanism.

According to the turret drive mechanism, it is possible to control the dividedly rotated positions of the plurality of respective turrets 11 and 12 so that positions of the respective tool attachment parts 11a and 12a in the dividedly rotated direction coincide with each other and the positions are mutually displaced by an arbitrary angle.

Note that since it is possible to dividedly rotate the turret by drive-controlling the respective turrets 11 and 12, similar to the conventional turret type tool post, a detailed explanation regarding the above will be omitted.

In the combined processing lathe provided with the tool post 10, it is possible to perform the boring processing and the like on the workpiece W by selecting the rotating tool 15 of either of the turrets 11 and 12, which is, for example, the rotating tool 15 of the turret 11, and rotating it to the processing position, moving the tool post 10 in the composite direction of X-axis, Y-axis and Z-axis, positioning the rotating tool 15 with respect to the workpiece W held by the main spindle 3 shown in FIG. 1 and FIG. 2, and rotating all of the tools including the rotating tool 15 by rotating the rotary shaft 103.

If it is designed such that the other turret 12 previously selects and rotates, during the processing, the rotating tool 15 to be used for the following processing to the processing position, it is possible to start the following processing using the previously selected rotating tool 15 only by moving the tool post 10 for a predetermined stroke in the Y-axis direction right after the completion of the current processing.

Here, by citing a workpiece processing step using two types of tools as an example, an explanation will be made by comparing a case where the workpiece processing step is conducted by a conventional combined processing lathe with a case where it is conducted by a combined processing lathe of the present invention, by using FIG. 4. Regarding the indication of operating axes in the drawing, X, Y and Z represent operations along the aforementioned X-axis, Y-axis and Z-axis, B represents a turning operation of the tool post, and ATC represents an automatic tool changing operation performed by a tool changer, respectively. Note that "tool 1" and "tool 2" used here represent "tool to be used for a certain processing" and "tool to be used for the following processing".

(a) in FIG. 4 shows the workpiece processing step performed by a lathe such as disclosed in the aforementioned Patent Document 1 which is provided with a tool post with a single spindle on which a conventional tool magazine is mounted. In this case, when the processing with the tool 1 is completed, the retreat operation of the tool post is conducted, the tool 1 is then automatically changed to the tool 2 to be used for the following processing by the tool changer, and the processing with the tool 2 is started by positioning and turning the tool 2. Therefore, it is necessary to provide three steps of unprocessing time between the processing with the tool 1 and the processing with the tool 2.

(b) in FIG. 4 shows the workpiece processing step performed by a lathe such as disclosed in the aforementioned Patent Document 3 in which a conventional turret capable of attaching tools at a plurality of stages is provided. In this case, when the processing with the tool 1 is completed, the retreat operation of the tool post is conducted, and the tool 2 to be used for the following processing is then selected and positioned by the turret, to thereby start the processing with the tool 2.

Therefore, it is still necessary to provide two steps of unprocessing time between the processing with the tool 1 and the processing with the tool 2.

(c) in FIG. 4 shows the workpiece processing step performed by the aforementioned combined processing lathe of the present invention. In this case, during the processing with the tool 1, the tool 2 to be used for the following processing is previously selected and an angle position thereof is previously decided, and when the processing with the tool 1 is completed, the processing with the tool 2 is started right after the positioning of the tool 2.

Therefore, the unprocessing time between the processing with the tool 1 and the processing with the tool 2 is only the time required for positioning the tool 2.

As described above, if the tool post according to the invention and the combined processing lathe provided with the tool post are used, it is possible to minimize the unprocessing time by constantly minimizing the time for selecting tools performed by the tool post, which enables to largely reduce the processing time per one workpiece.

Further, since it is possible to respectively and independently rotate (turn) the plurality of turrets by an arbitrary angle, the flexibility of processing is increased and a variety of processings can be realized, which will be described later.

Next, processing examples performed by using the combined processing lathe according to the invention will be described with reference to FIG. 5 to FIG. 8.

In these drawings, only substantial parts of the turrets and the spindles holding workpieces to be processed are shown in plan views. Each of the turrets in the embodiment has a regular hexagonal shape and tools are respectively attached to six surfaces of an outer peripheral surface thereof, in which the same reference numerals 11 and 12 as in the aforementioned embodiment are used for the sake of convenience, and the turrets are set to be an upper turret 11 and a lower turret 12 by being distinguished into an upper stage and a lower stage. To make the description concrete, for the tools, a drill 5 being a rotating tool and a cutting tool 6 being a turning tool are supposed to be used. The main spindle 3 supported by the headstock 2 is set to be a front spindle, and further, a back spindle 4 supported by a rear headstock (back spindle head) 8 is also used.

FIG. 5 shows an example where the upper turret 11 and the lower turret 12 are dividedly rotated while positions of tool attachment parts of the upper turret 11 and the lower turret 12 are coincided with each other, in which the tools are radially arranged, when seen planarly, in a state of being vertically overlapped with each other with each 60 degree interval between the centers of the respective tools. Subsequently, the drill 5 of the upper turret 11 and the cutting tool 6 of the lower turret 12 are dividedly rotated to selected positions and faced to a workpiece W1 held by the front spindle 3. Accordingly, similar to the flat turret, only by linearly moving the tool post in the Y-axis direction being orthogonal to the paper surface, it is possible to perform the cross boring processing using the drill 5 or the turning using the cutting tool 6 on the workpiece W1 by positioning either one of the tools to the processing position.

Figure 6:
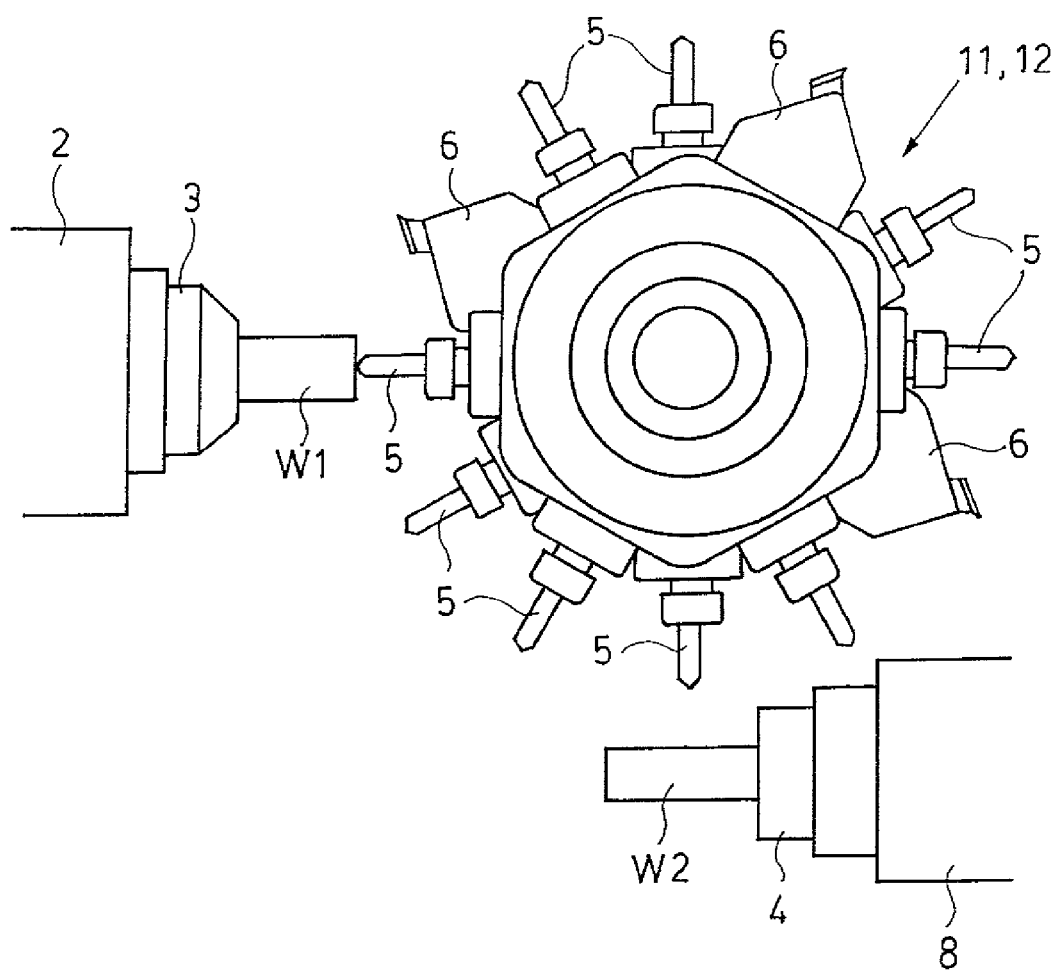
FIG. 6 is a substantial plan view showing a state where a front workpiece is being processed.

FIG. 6 shows an example where the upper turret 11 and the lower turret 12 are dividedly rotated while the positions of the tool attachment parts of the upper turret 11 and the lower turret 12 are shifted by 30 degrees to each other, in which the tools are radially arranged, when seen planarly, with each 30 degree interval between the centers of the respective tools. Subsequently, while the boring processing is performed on an end face of the workpiece W1 held by the main (front) spindle 3 using a certain drill 5 of the upper turret 11, a certain drill 5 of the lower turret 12 is dividedly rotated to a selected position, and is faced to a workpiece W2 held by the back spindle 4 supported by the rear headstock 8 in a direction orthogonal to the workpiece W2.

Figure 7:
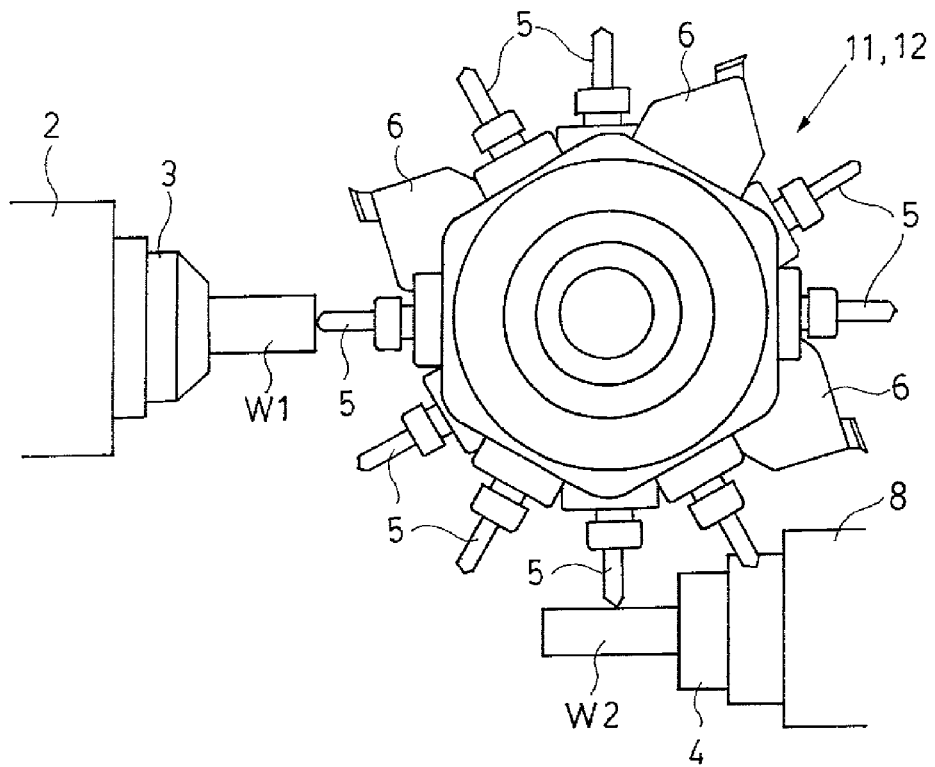
FIG. 7 is a substantial plan view showing a state where the front workpiece and a rear workpiece are being simultaneously processed.

When the back spindle 4 is moved from this state in the X-axis direction shown in FIG. 1, namely, to an upper direction in FIG. 6, it is possible to simultaneously conduct the cross boring processing on the workpiece W2 held by the back spindle 4 while performing the boring processing on the end face of the workpiece W1 held by the front spindle 3, as shown in FIG. 7. At this time, when the tool post is moved in a direction of the end face of the workpiece W1 in accordance with the boring processing, the back spindle 4 follows the movement, and also makes the necessary movement for performing the cross boring processing on the workpiece W2.

Figure 8:
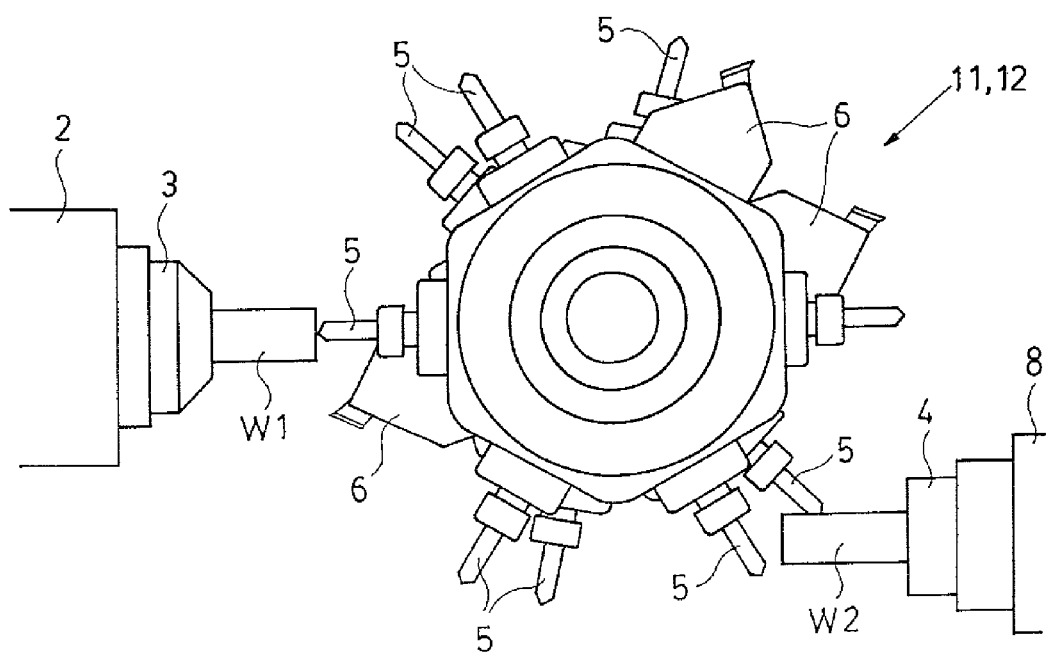
FIG. 8 is a substantial plan view showing another state where the front workpiece and the rear workpiece are being simultaneously processed.

FIG. 8 shows an example where the upper turret 11 and the lower turret 12 are to be dividedly rotated while the positions of the tool attachment parts of the upper turret 11 and the lower turret 12 are shifted by 15 degrees to each other. In this case, similar to the example shown in FIG. 7, it is possible to simultaneously conduct diagonal boring processing on the workpiece W2 held by the back spindle 4 using a certain drill 5 of the lower turret 12 while performing the boring processing on the end face of the workpiece W1 held by the front spindle 3 using a certain drill 5 of the upper turret 11. Also at this time, when the tool post is moved in the direction of the end face of the workpiece W1 in accordance with the boring processing, the back spindle 4 follows the movement, and also makes the necessary movement for performing the diagonal boring processing on the workpiece W2.

Next, various types of processings performed by another embodiment of the combined processing lathe according to the invention will be further described with reference to FIG. 9 to FIG. 22. Also in these drawings, the same reference numerals are attached to the portions corresponding to those shown in the aforementioned respective drawings, even if the shapes are more or less different from each other. In addition, for the rotating tools to be attached to the upper turret 11 and the lower turret 12, a drill 7 attached horizontally is also used. Further, among these drawings, those represented by odd numerals are front views and those represented by even numerals are perspective views, and each pair of the drawings shows the same situations.

In the description hereinbelow, the workpiece W1 held by the front spindle 3 is referred to as "front workpiece W1", and the workpiece W2 held by the back spindle 4 is referred to as "rear workpiece W2".

Figure 9:
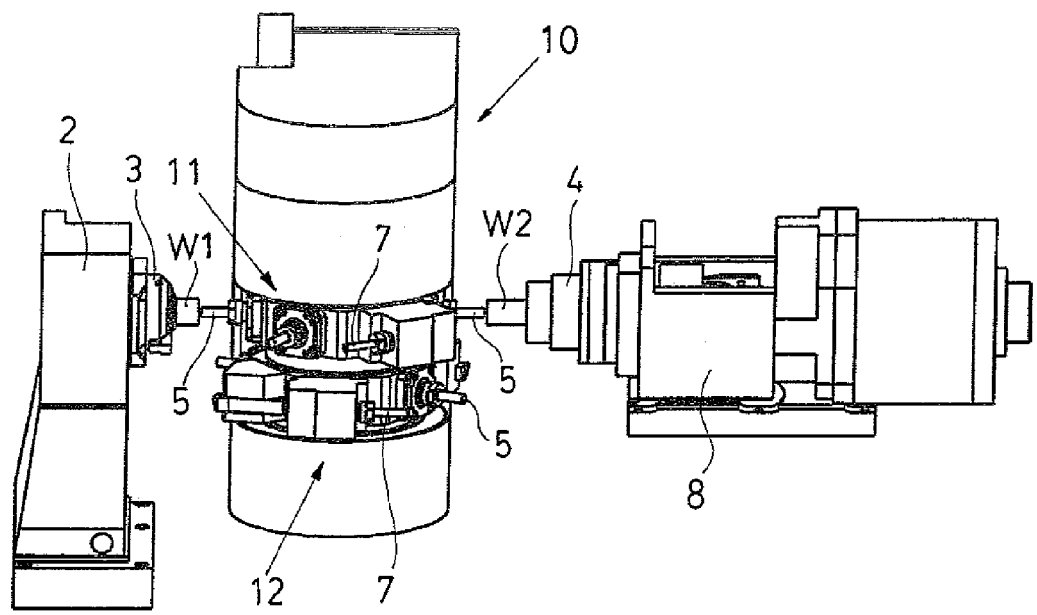
FIG. 9 is a front view showing a state where end face boring processing on a front workpiece and end face boring processing on a rear workpiece are simultaneously performed by an upper turret of another embodiment of the combined processing lathe according to the invention.
Figure 10:
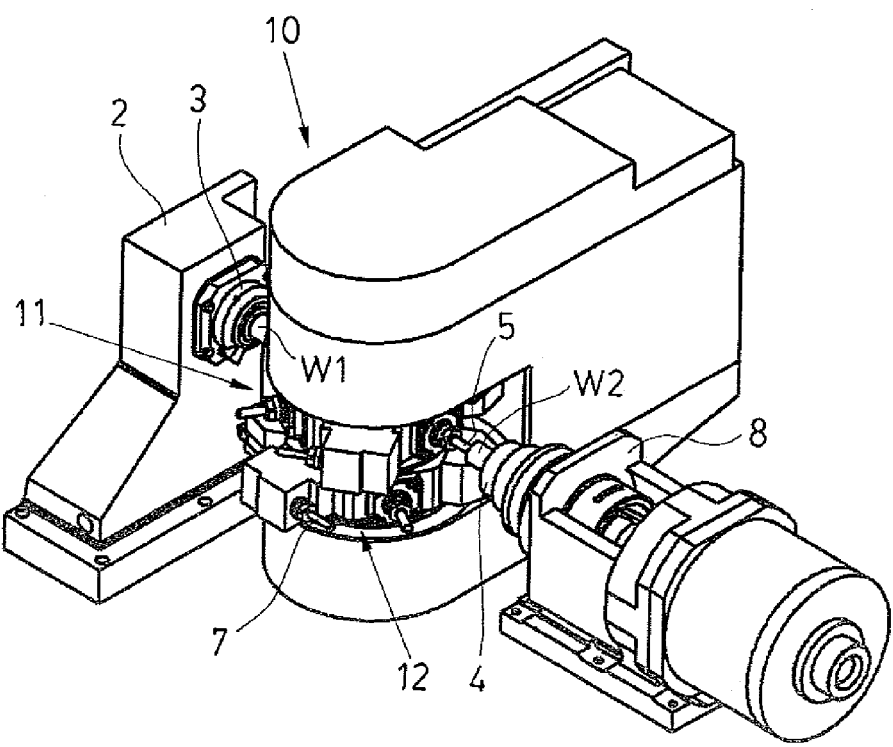
FIG. 10 is a perspective view of FIG. 9.

FIG. 9 and FIG. 10 show states where end face boring processing on the front workpiece W1 using a certain drill 5 of the upper turret 11 of the tool post 10 and end face boring processing on the rear workpiece W2 using another drill 5 of the same upper turret 11 are simultaneously performed.

Figure 11:
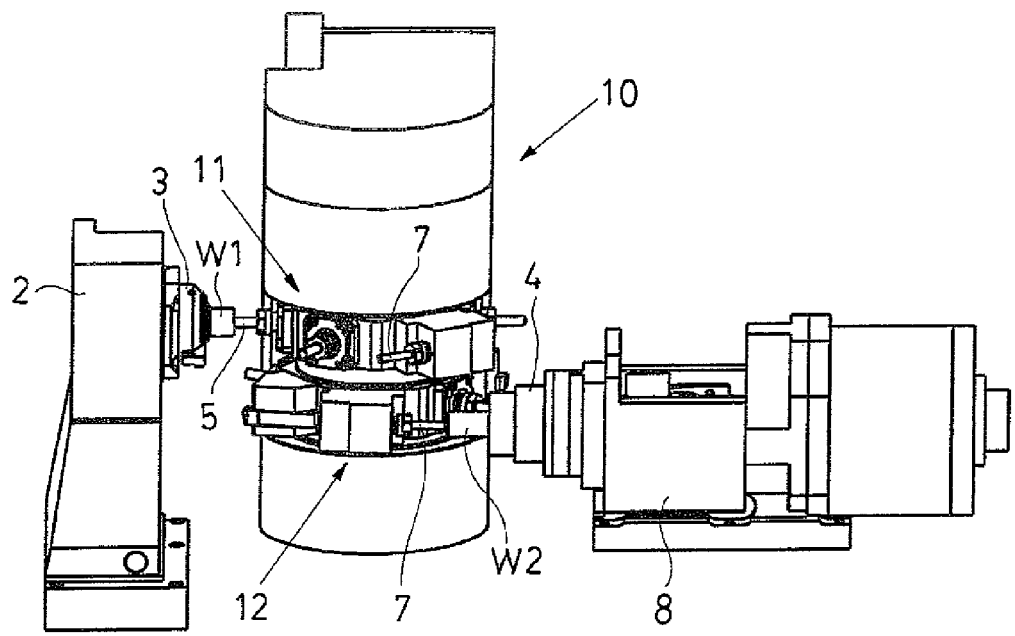
FIG. 11 is a front view showing a state where end face boring processing on the front workpiece using the upper turret and end face boring on the rear workpiece using a lower turret of the same embodiment are simultaneously performed.
Figure 12:
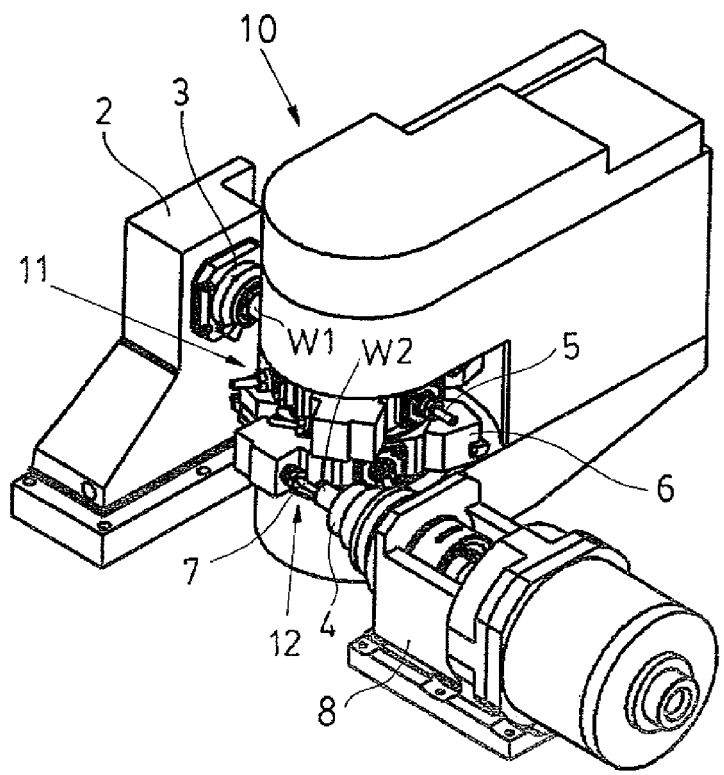
FIG. 12 is a perspective view of FIG. 11.

FIG. 11 and FIG. 12 show states where the end face boring processing on the front workpiece W1 using the drill 5 of the upper turret 11 and the end face boring processing on the rear workpiece W2 using the drill 7 attached horizontally of the lower turret 12 are simultaneously performed.

Figure 13:
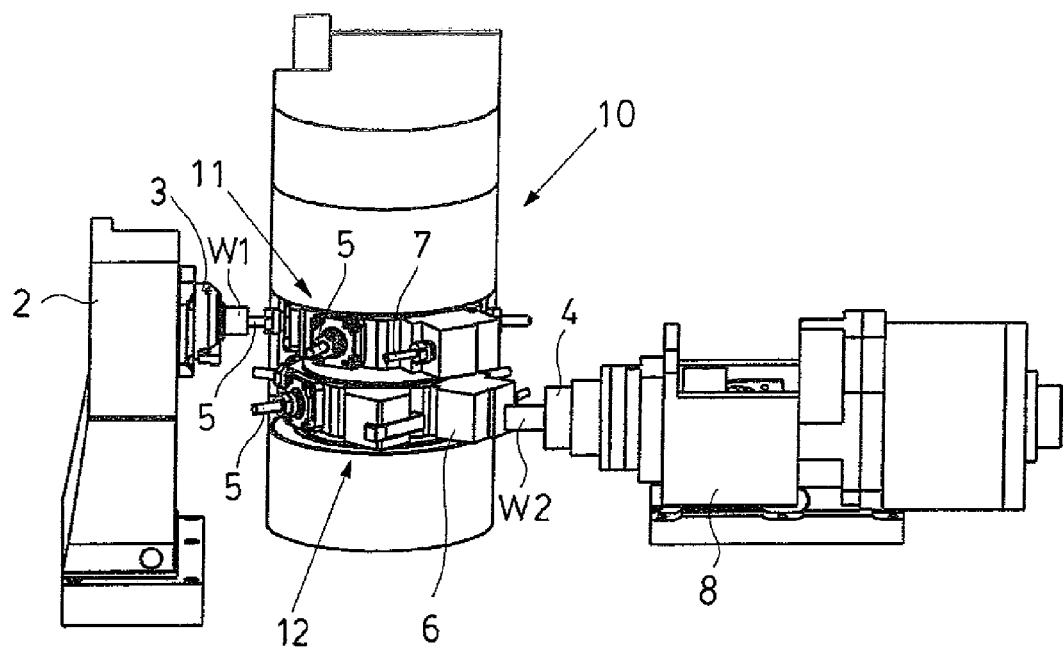
FIG. 13 is a front view showing a state where the lower turret of the same embodiment is being indexed.
Figure 14:
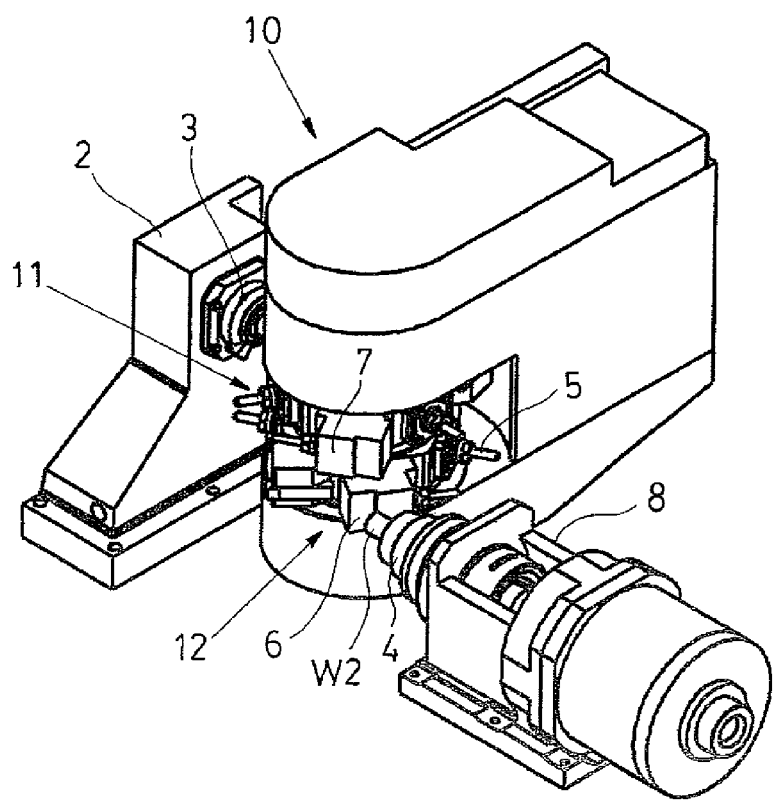
FIG. 14 is a perspective view of FIG. 13.

FIG. 13 and FIG. 14 show states where the tool necessary for the following processing is indexed (dividedly rotated to the selected position) by the lower turret 12, while the end face boring processing on the front workpiece W1 is performed by the drill 5 of the upper turret 11.

Figures 15, 16:
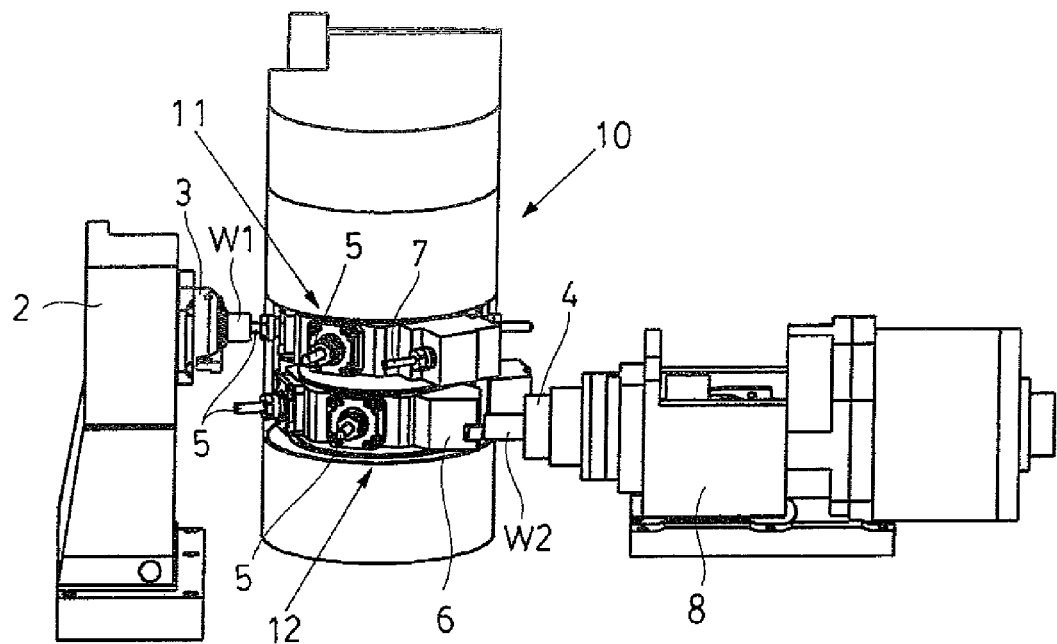
FIG. 15 is a front view showing a state where turning on the rear workpiece is performed after positioning the lower turret of the same embodiment.
FIG. 16 is a perspective view of FIG. 15.

FIG. 15 and FIG. 16 show states where the turning on the rear workpiece W2 is started after the completion of the positioning of the cutting tool 6 of the lower turret turret 12 during when the end face boring processing on the front workpiece W1 is similarly performed by the drill 5 of the upper turret 11.

Figure 17:
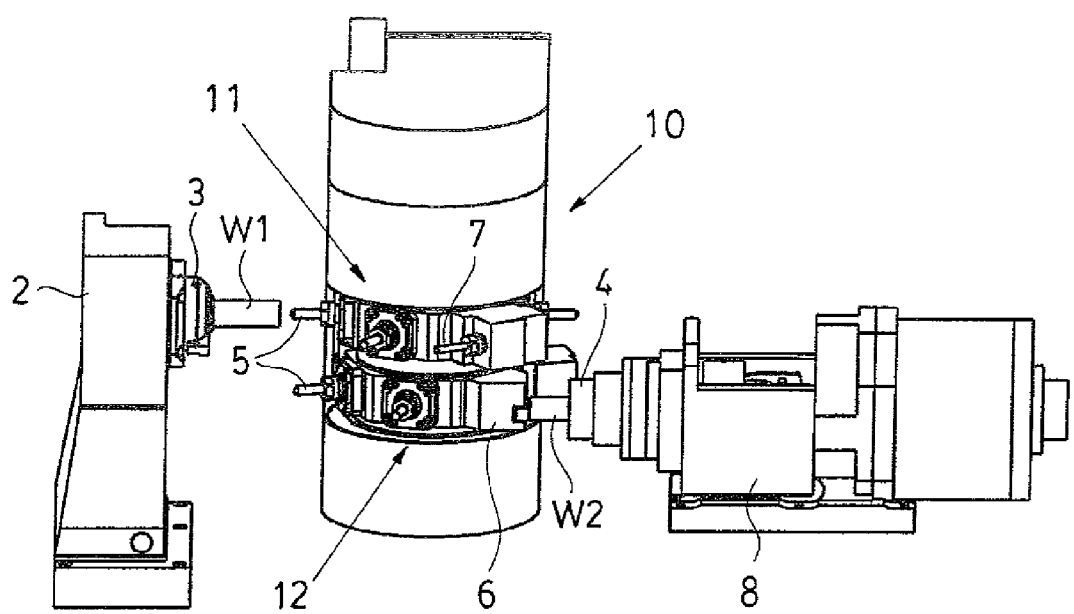
FIG. 17 is a front view showing a state where the front workpiece of the same embodiment is retreated.
Figure 18:
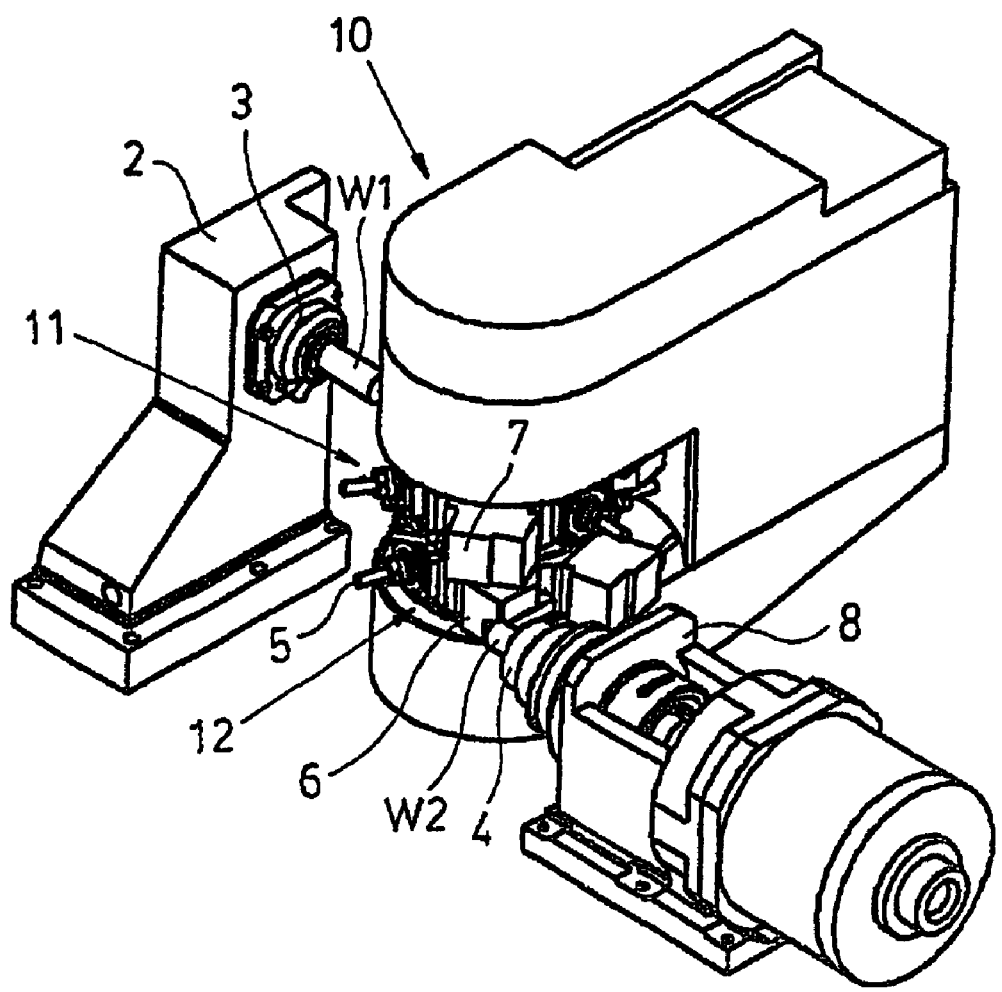
FIG. 18 is a perspective view of FIG. 17.

FIG. 17 and FIG. 18 show states where the end face boring processing on the front workpiece W1 is finished from the above state, and the front workpiece W1 is retreated by the front spindle 3.

Figure 19:
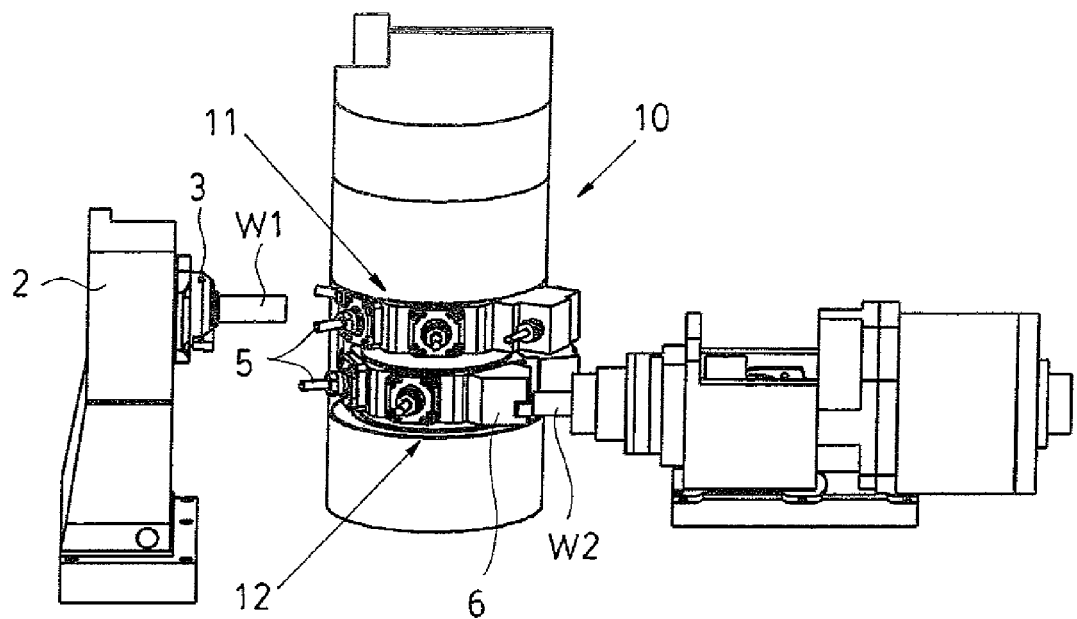
FIG. 19 is a front view showing a state where the upper turret of the same embodiment is being indexed.
Figure 20:
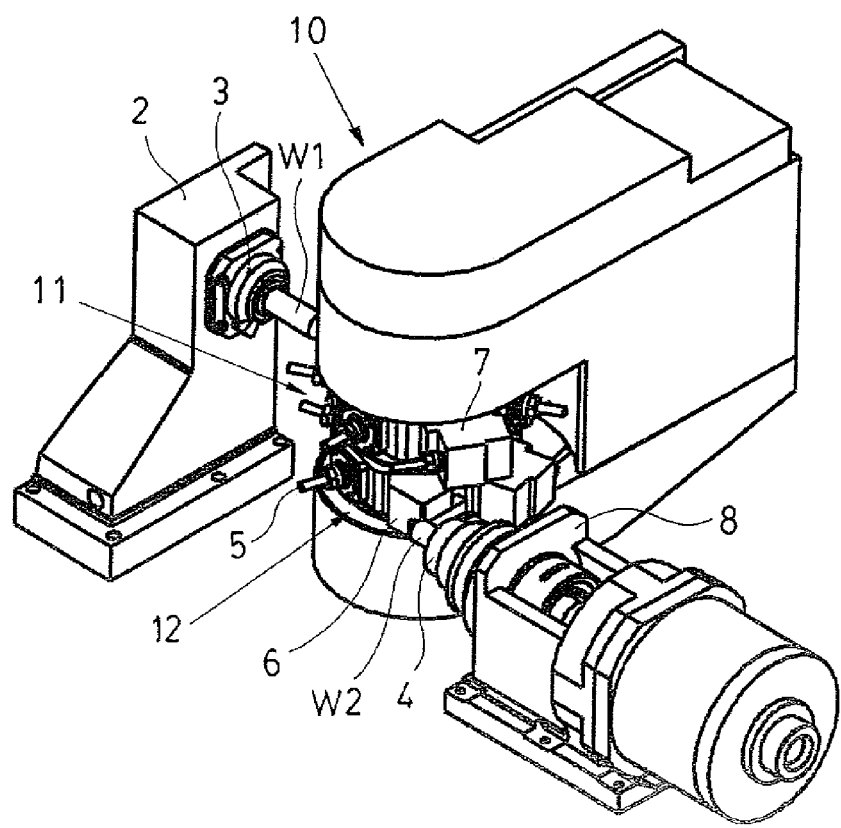
FIG. 20 is a perspective view of FIG. 19.

FIG. 19 and FIG. 20 show states where the upper turret 11 is indexing, from that state, the tool to be used next.

Figure 21:
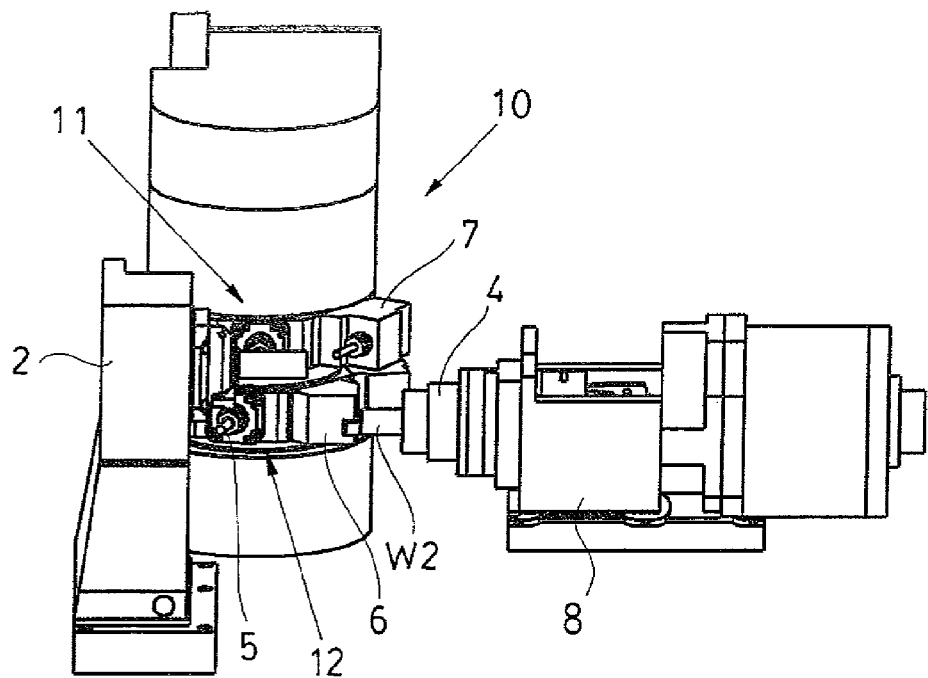
FIG. 21 is a front view showing a state where the upper turret of the same embodiment performs cross boring processing on the front workpiece.
Figure 22:
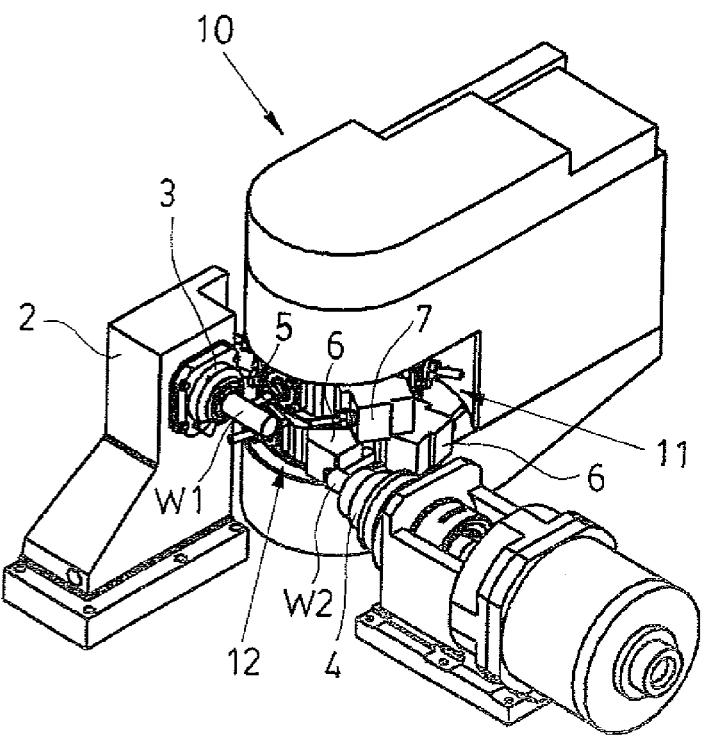
FIG. 22 is a perspective view of FIG. 21.

FIG. 21 and FIG. 22 show states where the upper turret 11 completes the indexing of the drill 5 and starts the cross boring processing on the front workpiece W1 during when the turning on the rear workpiece W2 is performed by the cutting tool 6 of the lower turret 12.

As described above, in the tool post according to the invention, the plurality of stages of respective turrets can perform the cutting processing while turning at arbitrary angles. Accordingly, it becomes possible to perform boring processing using drills having different and arbitrary inclinations with respect to respective center lines of the workpiece held by the front spindle and the workpiece held by the back spindle, processing of grooves and surfaces with the use of milling cutters, simultaneous processings of turning using cutting tools and boring processing using drills, and the like, which results in largely extending the flexibility of processing.

In the combined processing lathe shown in FIG. 9 to FIG. 22, it is also possible that the headstock 2 and the front spindle 3 are replaced with a guide bush support table and a guide bush, and the front spindle supported by the headstock is provided at a position in the further rear of the guide bush support table (in the left direction in the drawings represented by odd numerals such as FIG. 9). In such a case, since the guide bush does not move in the Z-axis direction (in the left and right directions in the drawings represented by odd numerals such as FIG. 9), the tool post 10 is only required to be designed to move in the Z-axis direction.

Since the aforementioned movements along the X-axis, Y-axis and Z-axis are the relative movements between the tool post 10 and the workpiece W, it is only required that at least either one of the tool post 10 and the main spindle or the guide bush holding the workpiece W can be moved, with respect to the other one, in the directions of respective axes.

Further, it is also possible that the tool post 10 is designed to rotate around the X-axis.

Figure 23:
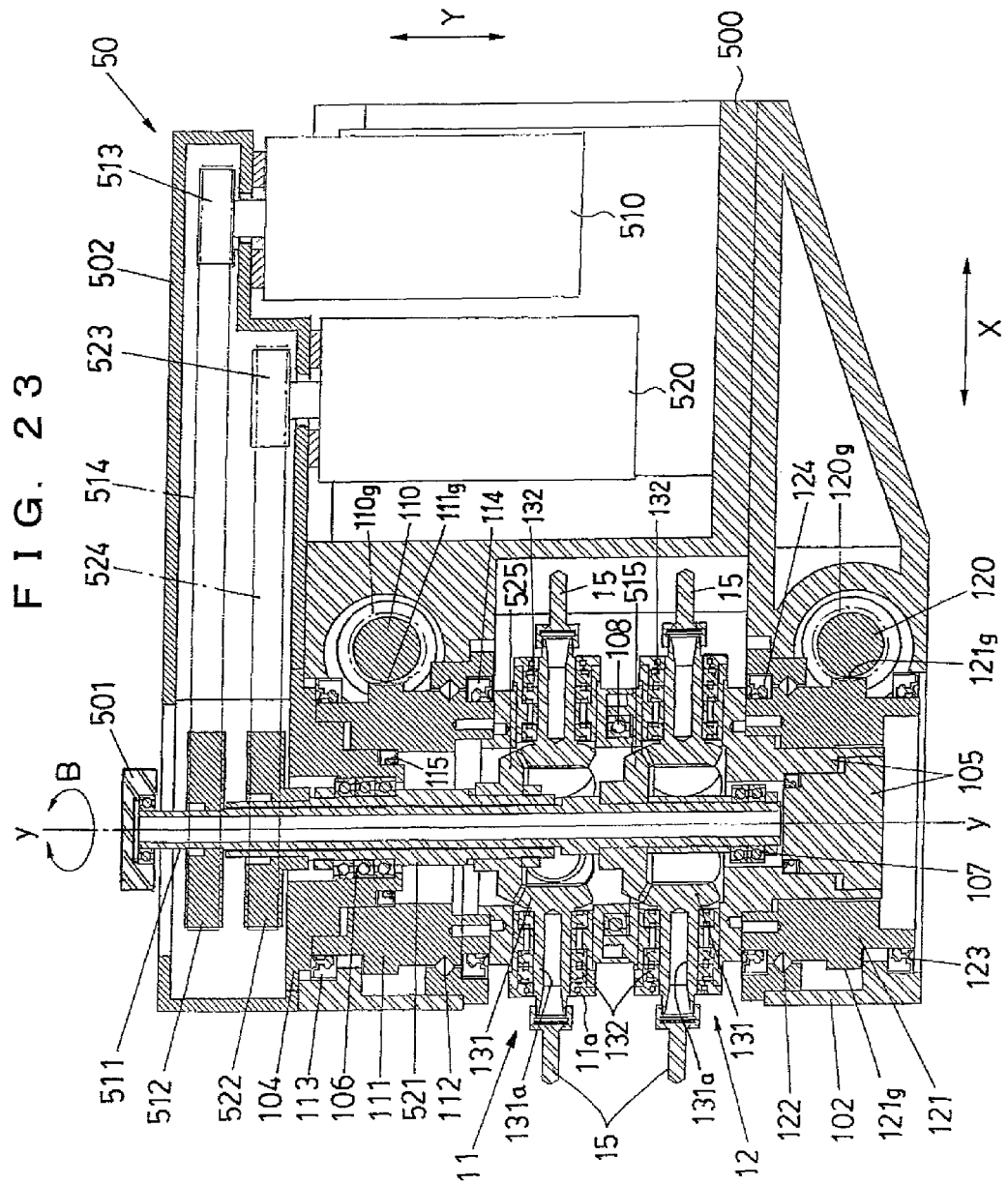
FIG. 23 is a longitudinal sectional view showing an internal configuration of another embodiment of the tool post according to the invention.

Next, another embodiment of the tool post according to the invention will be described using FIG. 23. FIG. 23 is a longitudinal sectional view showing an internal configuration of the tool post, and it corresponds to FIG. 3 showing the internal configuration of the aforementioned tool post. Therefore, the parts similar to the respective parts in FIG. 3 are designated by the same reference numerals, and a detailed explanation thereof will be omitted. However, a housing 500 of a tool post 50 corresponding to the turret housing 100 in FIG. 3 also serves as a housing for two rotating tool driving motors 510 and 520 for rotationally driving the respective rotating tools 15 attached to the respective turrets 11 and 12.

Figure 3:
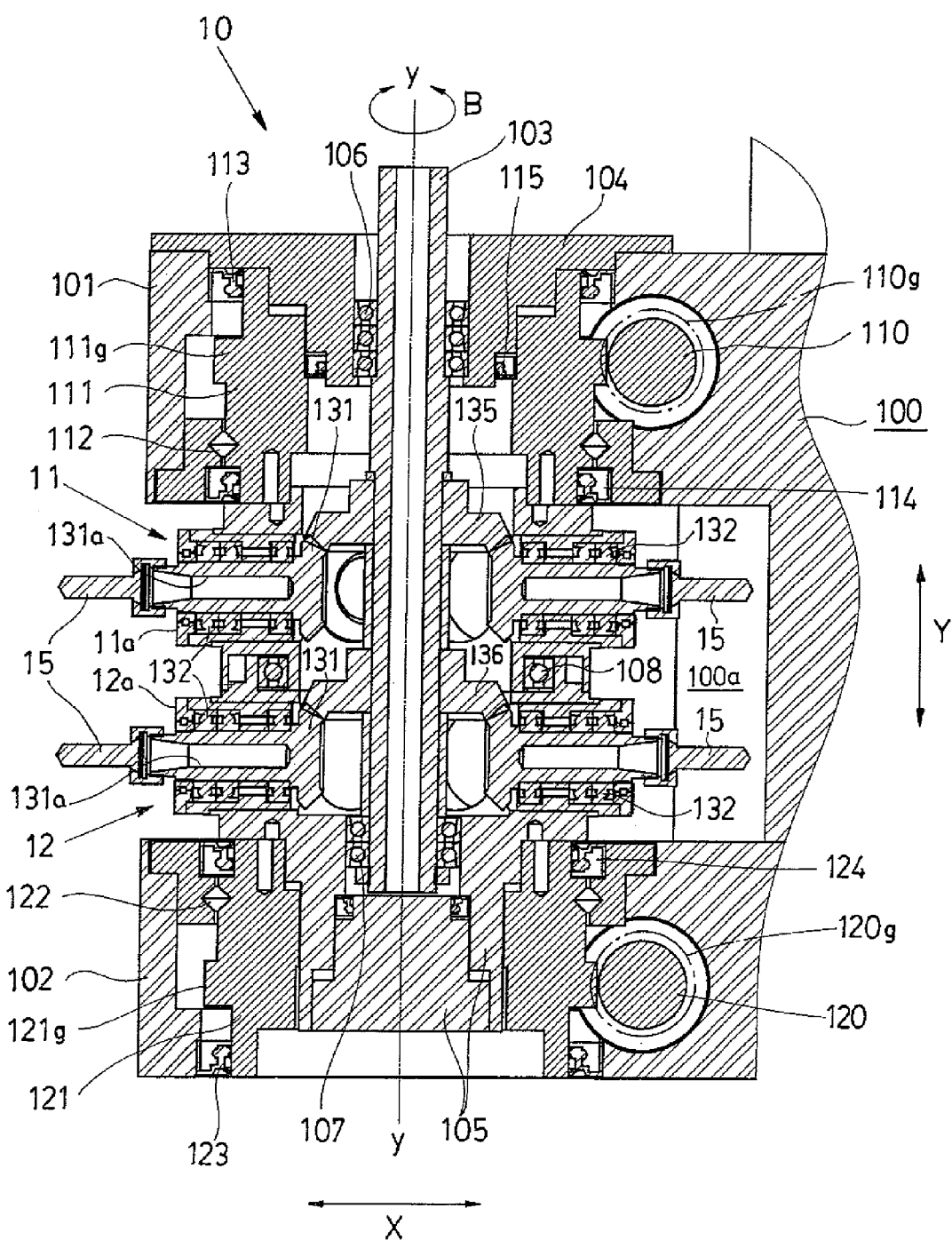
FIG. 3 is a longitudinal sectional view of the tool post taken along III-III line in FIG. 2.

A rotary shaft corresponding to the rotary shaft 103 in FIG. 3 is composed of a first rotary shaft 511 having a pipe shape and being rotatably supported between the rotary end plate 105 and a bearing plate 501 fixed to an outer surface of the housing 500 (detailed illustration is omitted) and a second rotary shaft 521 formed of an outer cylinder rotatably engaged with an outer peripheral surface of the first rotary shaft 511 and supported by the fixed end plate 104 via the ball bearing 106.

A belt pulley 512 is fixed to an upper end portion of the first rotary shaft 511, and a belt 514 is stretched between the belt pulley 512 and a belt pulley 513 fixed to a rotary shaft of the rotating tool driving motor 510. Further, a belt pulley 522 is fixed to an upper end portion of the second rotary shaft 521, and a belt 524 is stretched between the belt pulley 522 and a belt pulley 523 fixed to a rotary shaft of the rotating tool driving motor 520.

All of the above are provided inside a driving system cover 502.

Further, a bevel gear 515 engaging with all the bevel gears 131 in the lower stage of turret 12 and a bevel gear 525 engaging with all the bevel gears 131 in the upper stage of turret 11 are spline-connected to a lower end portion of the first rotary shaft 511 and to a lower end portion of the second rotary shaft 521, respectively, in which they are biased and locked by springs at predetermined positions in a direction along the axis y-y.

Therefore, when the first rotary shaft 511 is rotated as indicated by the arrow B by the rotating tool driving motor 510, all the bevel gears 131 engaging with the bevel gear 515 constituting the gear mechanism rotate, which results in rotating the respective rotating tools 15 inserted into the tool attachment parts 12a of the lower stage of turret 12. Further, when the second rotary shaft 521 is rotated as indicated by the arrow B by the rotating tool driving motor 520, all the bevel gears 131 engaging with the bevel gear 525 constituting the gear mechanism rotate, which results in rotating the respective rotating tools 15 inserted into the tool attachment parts 11a of the upper stage of turret 11.

As described above, in the tool post 50, the respective rotating tools 15 inserted into the tool attachment parts 11a of the upper stage of turret 11 and the respective rotating tools 15 inserted into the tool attachment parts 12a of the lower stage of turret 12 can be respectively and independently rotationally driven when necessary.

Note that also with the use of the tool post 50, by rotating the upper turret rotary shaft 110 or the lower turret rotary shaft 120 using each of the separate driving motors, it is possible to dividedly rotate (turn) the respective rotating tools 15 at desired positions by independently rotating the respective upper stage of turret 11 or the lower stage of turret 12 by an arbitrary rotation angle, similar to the aforementioned embodiment.

The tool post according to the invention which has been described above has the plurality of turrets independently provided on one moving tool post, so that it has both advantages of the turret and the flat turret, which are, regarding the tool arrangement on multiple faces as well as the arbitrary positioning of the turning angle of the tool, and a rapidity for selecting and changing the tool, respectively.

Therefore, it becomes possible that while one of the turrets performs processing, the other turret performs a preparation operation for selecting the tool, and further, the time for selecting and switching tools being the unprocessing time can be largely reduced by a combination of selection/change of the tools from one of the tool posts to the other one realized by the movement of the entire tool post in the axial direction. In addition, it becomes possible to increase the number of tools that can be selected.

Further, it also becomes possible that the tools are simultaneously positioned at arbitrary angles with respect to each of workpieces held by a plurality of spindles, and the tools perform processing on each of the workpieces while respectively and independently moving at arbitrary angles.

In the aforementioned respective embodiments, an example where the turrets are provided in two stages has been explained, but, the example is not limited thereto, and if the turrets in three stages or more capable of being dividedly rotated respectively and independently are provided, it becomes possible to rapidly select a greater variety of different tools.

Further, if the tool post having a tool magazine additionally provided therein is used, it also becomes possible to automatically change the tool, during when one of the tool posts performs processing, as a preparation operation of the other turret turret, so that the number of tools which can be used largely increases, resulting that a combined processing lathe having a largely extended flexibility in comparison with any conventional lathes can be provided.

INDUSTRIAL APPLICABILITY

The invention can be applied to a combined processing lathe which performs a plurality of different kinds of processings on a workpiece for machining, and to a tool post equipped in the lathe and selectably holding a plurality of tools to be used for the processings. Further, the invention can also be applied to various types of machine tools.

What is claimed is:

1. A tool post, comprising:
a plurality of turrets supported on a common turret housing each capable of being rotated around a common axis and having a plurality of tool attachment parts on an outer peripheral surface thereof disposed along the common axis, wherein said common axis extends along an axis of a rotary shaft that passes through each of said plurality of turrets; and
separate turret drive mechanisms dividedly rotating each of said plurality of respective turrets.

2. The tool post according to claim 1,
wherein said tool post has three axes of movement including a Z-axis being parallel to a spindle of a combined processing lathe, an X-axis being perpendicular to the Z-axis, and a Y-axis being orthogonal to a plane including the Z-axis and the X-axis, and the common axis is an axis along the Y-axis.

3. The tool post according to claim 1,
wherein each of said separate turret drive mechanisms comprises a turret rotary shaft rotated by a motor and a gear mechanism transmitting a rotation of the turret rotary shaft to said turret corresponding to the turret rotary shaft.

4. The tool post according to claim 2,
wherein each of said respective separate turret drive mechanisms comprises a turret rotary shaft rotated by a motor and a gear mechanism transmitting a rotation of the turret rotary shaft to said turret corresponding to the turret rotary shaft.

5. The tool post according to claim 1,
wherein each of said separate turret drive mechanisms can control dividedly rotated positions of said plurality of turrets respectively so that positions of said tool attachment parts in the dividedly rotated direction coincide with each other and the positions shifted by an arbitrary angle each other.

6. The tool post according to claim 1,
wherein at least one of said plurality of tool attachment parts of each of said plurality of turrets is a rotating tool attachment part; and
further comprising a rotating tool drive mechanism rotating a plurality of rotating tools to be attached to each of the rotating tool attachment parts using a common rotary shaft.

7. The tool post according to claim 1,
wherein at least one of said plurality of tool attachment parts of each of said plurality of turrets is a rotating tool attachment part; and
further comprising a rotating tool drive mechanism rotating rotating tools to be attached to said rotating tool attachment parts of said plurality of turrets by each turret using separate rotary shafts driven by separate rotating tool driving motors.

8. A combined processing lathe, comprising
a tool post having three axes of movement including a Z-axis being parallel to a spindle, an X-axis being perpendicular to the Z-axis, and a Y-axis being orthogonal to a plane including the Z-axis and the X-axis,
wherein said tool post comprising:
a plurality of turrets supported on a common turret housing each capable of being rotated around a common axis along the Y-axis and having a plurality of tool attachment parts on an outer peripheral surface thereof disposed along the common axis, wherein said common axis extends along an axis of a rotary shaft that passes through each of said plurality of turrets; and
separate turret drive mechanisms dividedly rotating respectively each of said plurality of turrets.

9. The combined processing lathe according to claim 8, wherein each of said separate turret drive mechanisms comprises a turret rotary shaft rotated respectively by a motor and a gear mechanism transmitting a rotation of the turret rotary shaft to said turret corresponding to the turret rotary shaft.

10. The combined processing lathe according to claim 8, wherein each of said separate turret drive mechanisms can control dividedly rotated positions of said plurality of turrets respectively so that positions of said tool attachment parts in the dividedly rotated direction coincide with each other and the positions are shifted by an arbitrary angle each other.

11. The combined processing lathe according to claim 9, wherein each of said separate turret drive mechanisms can control dividedly rotated positions of said plurality of turrets respectively so that positions of said tool attachment parts in the dividedly rotated direction coincide with each other and the positions are shifted by an arbitrary angle each other.

12. The combined processing lathe according to claim 8, wherein at least one of said plurality of tool attachment parts of each of said plurality of turrets is a rotating tool attachment part; and
wherein said tool post has a rotating tool drive mechanism rotating a plurality of rotating tools to be attached to each of the rotating tool attachment parts using a common rotary shaft.

13. The combined processing lathe according to claim 8, wherein at least one of said plurality of tool attachment parts of each of said plurality of respective turrets is a rotating tool attachment part; and
wherein said tool post has a rotating tool drive mechanism rotating a rotating tool to be attached to said rotating tool attachment part of said plurality of turrets respectively by each turret using separate rotary shafts driven by separate rotating tool driving motors.

14. The tool post according to claim 2, wherein each of said separate turret drive mechanisms can control dividedly rotated positions of said plurality of turrets respectively so that positions of said tool attachment parts in the dividedly rotated direction coincide with each other and the positions shifted by an arbitrary angle each other.

15. The tool post according to claim 2, wherein at least one of said plurality of tool attachment parts of each of said plurality of turrets is a rotating tool attachment part; and
further comprising a rotating tool drive mechanism rotating a plurality of rotating tools to be attached to each of the rotating tool attachment parts using a common rotary shaft.

16. The tool post according to claim 5, wherein at least one of said plurality of tool attachment parts of each of said plurality of turrets is a rotating tool attachment part; and
further comprising a rotating tool drive mechanism rotating a plurality of rotating tools to be attached to each of the rotating tool attachment parts using a common rotary shaft.

17. The tool post according to claim 2, wherein at least one of said plurality of tool attachment parts of each of said plurality of turrets is a rotating tool attachment part; and
further comprising a rotating tool drive mechanism rotating rotating tools to be attached to said rotating tool attachment parts of said plurality of turrets by each turret using separate rotary shafts driven by separate rotating tool driving motors.

18. The tool post according to claim 5, wherein at least one of said plurality of tool attachment parts of each of said plurality of turrets is a rotating tool attachment part; and
further comprising a rotating tool drive mechanism rotating rotating tools to be attached to said rotating tool attachment parts of said plurality of turrets by each turret using separate rotary shafts driven by separate rotating tool driving motors.

19. The combined processing lathe according to claim 9, wherein at least one of said plurality of tool attachment parts of each of said plurality of turrets is a rotating tool attachment part; and
wherein said tool post has a rotating tool drive mechanism rotating a plurality of rotating tools to be attached to each of the rotating tool attachment parts using a common rotary shaft.

20. The combined processing lathe according to claim 10, wherein at least one of said plurality of tool attachment parts of each of said plurality of turrets is a rotating tool attachment part; and
wherein said tool post has a rotating tool drive mechanism rotating a plurality of rotating tools to be attached to each of the rotating tool attachment parts using a common rotary shaft.

21. The combined processing lathe according to claim 10, wherein at least one of said plurality of tool attachment parts of each of said plurality of respective turrets is a rotating tool attachment part; and
wherein said tool post has a rotating tool drive mechanism rotating a rotating tool to be attached to said rotating tool attachment part of said plurality of turrets respectively by each turret using separate rotary shafts driven by separate rotating tool driving motors.

22. The combined processing lathe according to claim 8, wherein said tool post is adapted such that while one of the turrets performs processing, the other turret performs a preparation operation for selecting a tool, including rotating an angular position of the other turret to position a tool in a ready position during said processing of said one of said turrets.

23. The combined processing lathe according to claim 8, said tool post is adapted such that a plurality of said turrets are configured to operate simultaneously on two workpieces, including said tool post being adapted such that when the tool post is moved in a direction of a first workpiece, a spindle is adapted to follow the movement in the direction of the first workpiece and to make necessary movement for processing a second workpiece.

* * * * *